United States Patent
Wu

(10) Patent No.: US 8,448,842 B1
(45) Date of Patent: May 28, 2013

(54) ADVANCED COPPER BONDING (ACB) WITH CERAMIC SUBSTRATE TECHNOLOGY

(75) Inventor: Rong-Fu Wu, Hsinchu County (TW)

(73) Assignee: Vaclong Vacuum Technology Co., Ltd., Hsinchu County (TW)

( * ) Notice: Subject to any disclaimer, the term of this patent is extended or adjusted under 35 U.S.C. 154(b) by 0 days.

(21) Appl. No.: 13/335,085

(22) Filed: Dec. 22, 2011

(51) Int. Cl.
*B23K 20/02* (2006.01)

(52) U.S. Cl.
USPC ........... 228/209; 228/193; 228/208; 427/531; 427/532; 427/523; 427/483; 427/205; 205/163

(58) Field of Classification Search
USPC ............. 228/193, 208, 209; 427/531, 532, 427/523, 483, 205; 205/163
See application file for complete search history.

(56) References Cited

U.S. PATENT DOCUMENTS

| | | | | |
|---|---|---|---|---|
| 3,287,478 A * | 11/1966 | Pallen et al. | ................... | 264/638 |
| 3,766,634 A | 10/1973 | Babcock et al. | | |
| 4,505,418 A | 3/1985 | Neidig et al. | | |
| 5,490,628 A | 2/1996 | Beatty | | |
| 5,693,199 A * | 12/1997 | Bourez et al. | ............ | 204/192.12 |
| 5,812,925 A * | 9/1998 | Ecer | ............... | 428/548 |
| 2007/0231590 A1 * | 10/2007 | Blum | ............. | 428/469 |

FOREIGN PATENT DOCUMENTS

TW     096148408     7/2009

* cited by examiner

*Primary Examiner* — Keith Walker
*Assistant Examiner* — Erin Saad
(74) *Attorney, Agent, or Firm* — Muncy, Geissler, Olds & Lowe, PLLC

(57) ABSTRACT

An advanced copper bonding with ceramic substrate technology includes the steps of (1) forming a copper film of thickness <1 μm on a ceramic substrate by sputtering deposition under $1.33 \times 10^{-3}$ torr and 150° C., (2) plating a copper layer of thickness 10~50 μm at room temperature, and (3) bonding a copper foil to the ceramic substrate by diffusion bonding under environments of high temperature, vacuum, and negative pressure inertia gas or $H_2$ partial pressure.

5 Claims, 4 Drawing Sheets

US 8,448,842 B1

ADVANCED COPPER BONDING (ACB) WITH CERAMIC SUBSTRATE TECHNOLOGY

BACKGROUND OF THE INVENTION

1. Field of the Invention

The present invention relates to a method for bonding copper foils to a ceramic substrate and more particularly, to an advanced copper bonding (ACB) with ceramic substrate technology for making a composite plate by: depositing a copper film on a ceramic substrate by a sputtering technique, and then electroplating a copper layer on the copper film to form a composite copper layer at the ceramic substrate, and then pressing a copper foil on the composite copper layer with ceramic substrate by putting the copper foil on the composite copper layer with ceramic substrate in a high-temperature sintering furnace to let the composite copper layer and the copper foil be bonded into a copper strip by a diffusion bonding technique under environments of high temperature, vacuum, and negative pressure caused by inert gas or $H_2$ partial pressure.

2. Description of the Related Art

The currently popularly used method for bonding copper foils to a ceramic substrate is DBC (direct bonding copper) technology. This technology includes the process of forming copper oxide at the interface of each of two copper foils, the step of attaching the copper oxide-coated copper foils to a ceramic substrate, and the step of employing eutectic sintering under temperature 1065~1083° C. to have the copper oxide-coated copper foils and the ceramic substrate be bonded together.

U.S. Pat. No. 5,490,628 discloses a technique of directly bonding a ceramic member to a copper composite substrate by heating to diffuse copper to the surface of the copper composite substrate at 1200° C., oxidizing the surface of the copper composite substrate following heating, pressing a ceramic member in contact with the resulting oxidized substrate, and forming a copper-copper oxide eutectic at the interface between the copper composite substrate and the ceramic member by heating under temperature 1065~1083° C. The eutectic, upon cooling, forms a bond between the copper composite and the ceramic.

U.S. Pat. No. 3,766,634 discloses a method for direct bonding of metallic members to non-metallic members at elevated temperatures in a controlled reactive atmosphere by: pressing copper in contact with alumina substrate, heating copper and alumina substrate in a reactive atmosphere to create a copper-copper oxide eutectic melt which, upon cooling, bonds the copper to the substrate.

U.S. Pat. No. 4,505,418 discloses a method for directly bonding copper foils having a copper oxide layer to oxide-ceramic substrates by heating the ceramic substrate covered with the copper foil in an oxygen-containing atmosphere at a pressure of not more than 1 mbar while maintaining a furnace atmosphere with a partial oxygen pressure between 0.001 and 0.1 mbar.

Taiwan Patent Application 096148408 discloses a method for preparing a composite plate by: preparing a ceramic substrate and a copper foil; forming a layer of copper oxide at one surface of the copper foil by wet air oxidation; bonding the layer of copper oxide of the copper foil to one surface of the ceramic substrate by heating.

According to the aforesaid various prior art techniques, bonding a copper foil to a ceramic substrate is done by: forming a layer of copper oxide at one surface of the copper foil and then pressing the copper foil and the ceramic substrate in a sintering furnace for heating at a temperature above the eutectic melting point and below the melting point of copper. These prior art techniques require a complicated manufacturing process. If an aluminum nitride ceramic substrate is used, it is necessary to form a layer of aluminum oxide on the surface of the aluminum nitride ceramic substrate for bonding with the layer of copper oxide at one surface of the prepared copper foil by eutectic sintering. This technique involves multiple heat-treatment processes, wasting much energy.

SUMMARY OF THE INVENTION

The present invention has been accomplished under the circumstances in view. It is the main object of the present invention to provide an advanced copper bonding (ACB) with ceramic substrate technology, which has the advantages of simple manufacturing process and energy-saving characteristic.

To achieve this and other objects of the present invention, an advanced copper bonding (ACB) with ceramic substrate technology includes a first step of depositing a copper film on a ceramic substrate in a sputtering machine, a second step of electroplating a copper layer on the copper film to form a composite copper layer, and a third step of pressing a copper foil on the composite copper layer with the ceramic substrate and then putting the copper foil on the composite copper layer with the ceramic substrate in a high-temperature sintering furnace to let the copper dielectric layer and the copper foil be bonded into a copper strip by a diffusion bonding technique under environments of high temperature, vacuum, and negative pressure inertia gas or $H_2$ partial pressure where diffusion between the surface of the copper strip and atoms of the ceramic substrate causes formation of a bonding layer so that the copper strip and the ceramic substrate are tightly bonded together, forming a composite plate.

DETAILED DESCRIPTION OF THE INVENTION

The advantages and features of the present invention will be fully understood by reference to the following two examples in conjunction with the accompanying drawings.

Figure 1:
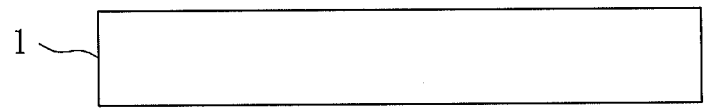
FIG. 1 is a schematic drawing illustrating a ceramic substrate prepared according to the present invention.
Figure 2:
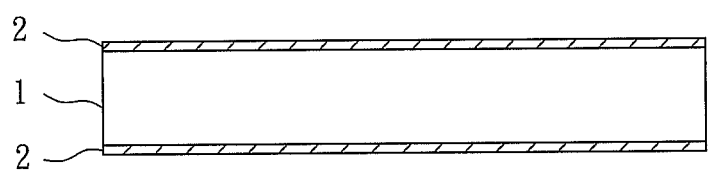
FIG. 2 corresponds to FIG. 1, illustrating copper films deposited on opposing top and bottom surfaces of the ceramic substrate.
Figure 3:
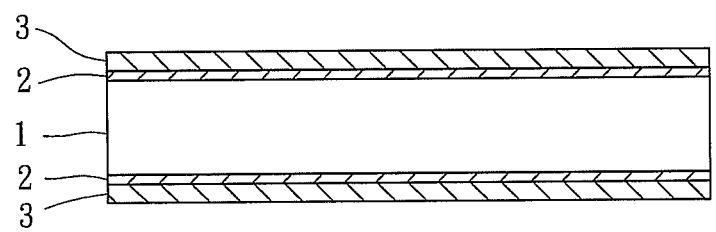
FIG. 3 corresponds to FIG. 2, illustrating a copper layer electroplated on each of the copper films at the top and bottom surfaces of the ceramic substrate.
Figure 4:
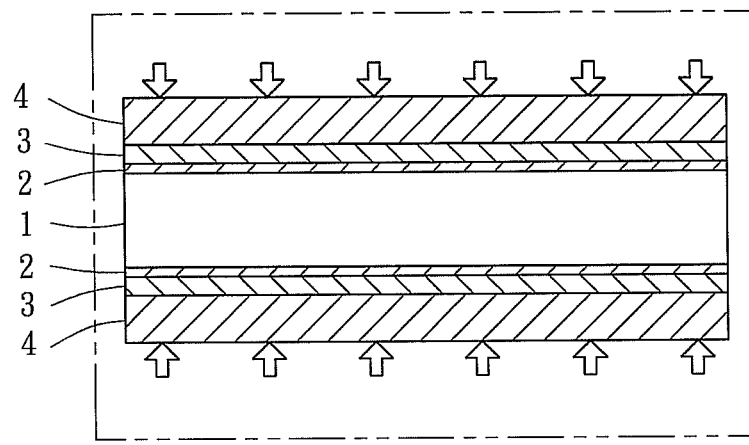
FIG. 4 corresponds to FIG. 3, illustrating two copper foils respectively bonded to the copper layers on the two copper films at the top and bottom surfaces of the ceramic substrate by heating in a sintering furnace under $\leq 1$ atmosphere pressure.
Figure 5:
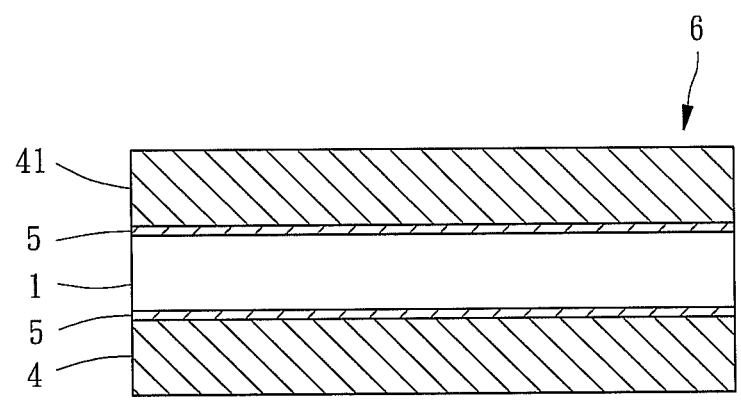
FIG. 5 corresponds to FIG. 4, illustrating formation of a copper strip at each of the opposing top and bottom surfaces of the ceramic substrate.

Referring to FIG. 1 through FIG. 5, the advanced copper bonding (ACB) with ceramic substrate technology of the invention provides a diffusion bonding technique for bonding copper foils to a ceramic substrate. The diffusion bonding technique includes the step of preparing copper foils and a ceramic substrate. The ceramic substrate is made by: casting aluminum trioxide ($Al_2O_3$) or aluminum nitride (AlN) onto a flat moving carrier surface subject to the application of a green tape casting process and sintering those green tapes at 1900° C. at atmospheric pressure or under a non-oxygen environment into the desired ceramic substrate 1 (see FIG. 1).

PROCESS I: Put a ceramic substrate 1 in a sputtering machine and operate the sputtering machine under the conditions of operating temperature about 150° C. and vacuum about $1.33 \times 10^{-3}$ torr to have two copper films 2 of thickness smaller than 1 μm to be respectively deposited on opposing top and bottom surfaces of the ceramic substrate 1 (see FIG. 2).

PROCESS II: Electroplate a copper layer 3 on the surface of each of the two copper films 2 prepared by PROCESS I at room temperature so that each copper layer 3 with the respective copper film 2 can form a copper dielectric layer having a thickness within 10~50 μm. After deposition of copper films on the top and bottom surfaces of the ceramic substrate, put the ceramic substrate in an electroplating bath carrying an electrolyte, and then apply a DC current to the electroplating bath to start electroplating. In this example, sulfate copper plating solution is used as an electrolyte. Sulfate copper plating solution is commonly used in electronic industry for copper plating for the advantages of high stability, low cost, low toxicity, high current efficiency and applicability of high current density. Therefore, the use of sulfate copper plating solution achieves high production efficiency. Sulfate copper plating solution mainly contains $CuSO_4$, $H_2SO_4$, $Cl^-$ and organic additives. $CuSO_4$ is the main salt, the source for $Cu^{2+}$ in the electrolyte. The concentration of $CuSO_4$ in the electrolyte must be properly controlled. Excessively high concentration of $CuSO_4$ in the electrolyte accelerates the speed of deposition, resulting in growth of bigger crystal grain and affecting the deep plating performance of the electrolyte. $H_2SO_4$ enhances the conductivity of the electrolyte and avoids $Cu^{2+}$ from dehydration. The concentration of $H_2SO_4$ in the electrolyte must also be properly controlled. Excessively high concentration of $H_2SO_4$ in the electrolyte lowers the dispersion capability of the electrolyte. Excessively low concentration of $H_2SO_4$ in the electrolyte increases the fragility of the electroplated layer and lowers its toughness. $Cl^-$ can enhance anode activity, promote anode dissolution, and avoid anode passivation. It can also reduce the formation of "copper powder" due to incomplete anodic dissolution, increase plating layer level-up and brightness and improve the mass of the electroplated layer. Additives are important in an acid copper electrolyte. Normally, carrier, brightener and leveler are used. To achieve optimal effects, several additives should be added. The added additives can change the surface absorption of the electrodes, thereby changing the structure of the electroplated layer.

PROCESS III: Prepare two well-cleaned copper foils 4, and then bond the two copper foils 4 to the copper layer 3 on the two copper films 2 at the top and bottom surfaces of the ceramic substrate 1 processed through PROCESS II by heating in a sintering furnace (see FIG. 4). The sintering furnace can contain therein a vacuum, negative pressure caused by inert gas or $H_2$ partial pressure, keeping its internal pressure $\leq 1$ atmosphere pressure. By means of diffusion bonding, each copper foil 4 is bonded with the respective copper layer 3 and the respective copper film 2, forming a respective copper strip 41 where diffusion between the surface of each copper strip 41 and the atoms of the ceramic substrate 1 causes formation of a bonding layer 5. Thus, the two copper strips 41 and the ceramic substrate 1 are tightly bonded together, forming a composite plate 6 (see FIG. 5).

The aforesaid copper foils 4 must be well cleaned before bonding, removing impurities, lubricants or any other surface contaminant. Cleaning of the copper foils 4 can be done by: dipping the copper foils 4 in diluted hydrochloric acid solution at temperature below 60° C. for 1 minute, and then picking up the copper foils 4 from diluted hydrochloric acid solution and rinsing the copper foils 4 with de-ionized water. The aforesaid diffusion bonding technique is applicable under temperature within 900~1200° C. The pressure on bonding between the ceramic substrate 1 and the copper foils 4 is within 1~10 kg/cm². If the sintering furnace is under an inert gas environment, the vacuum is within 1~760 torr; if under a $H_2$ partial pressure environment, the pressure is set at 2 psi, and the bonding time is 5~10 minutes.

The aforesaid diffusion bonding is the key point of the present invention.

This diffusion bonding is a method of joining metals, relies only on the surfaces diffusing into one another under high pressure and high temperature environments. Two metals are pressed together with force and at z high temperature. Metal atoms diffuse into the adjacent material forming what is called a diffusion bond. During bonding process, no oxygen is needed as an intermediate layer to assist bonding, eliminating multiple heat-treatment processes.

The aforesaid PROCESS II can be omitted if the thickness of the copper foils is over 100 μm. In this case, the copper dielectric layers formed on the sputtered copper films 2 are directly attached with the ceramic substrate 1 and the copper foils 4, and a diffusion bonding technique is employed to achieve bonding between the copper foils 4 and the two opposite sides of the ceramic substrate 1, thereby forming the desired composite plate 6 without electroplating a copper layer 3 on the surface of each of the two copper films 2 and the ceramic substrate 1 prepared by PROCESS I.

In the PROCESS II, the copper layer 3 can be made by screen printing to form a composite copper layer. The thickness of the composite copper layer is between 10~50 μm and then bond the copper layer 3 and the ceramic substrate 1 by heating in a sintering furnace. The sintering furnace contains negative pressure caused by inert gas. The vacuum is within 1~760 torr; if under a $H_2$ partial pressure environment, the pressure is set at 2 psi, and the bonding time is 5~10 minutes. The aforesaid diffusion bonding technique is applicable under temperature within 500~1000° C.

Figure 6:
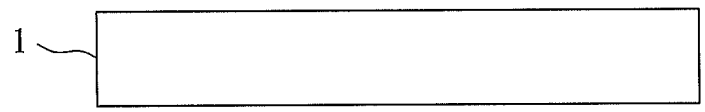
FIG. 6 is a schematic drawing of a ceramic substrate prepared according to the present invention.
Figure 7:
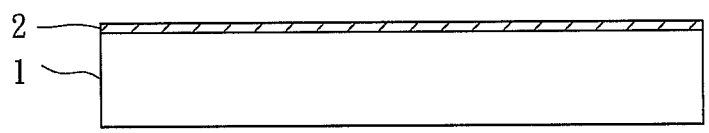
FIG. 7 is a schematic drawing illustrating a copper film deposited on one surface of the substrate in accordance with the present invention.
Figure 8:
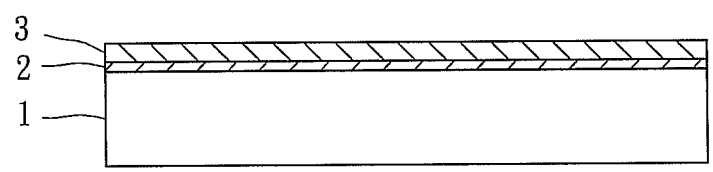
FIG. 8 corresponds to FIG. 7, illustrating copper plated on the copper film at the substrate.
Figure 9:
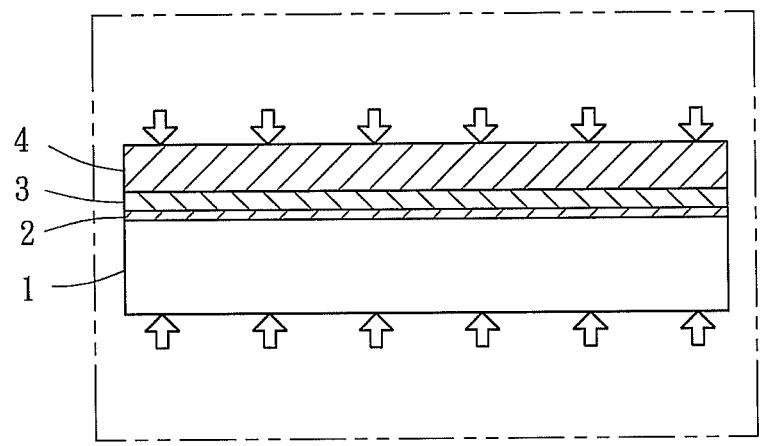
FIG. 9 corresponds to FIG. 8, illustrating a copper foil bonded to the copper layer on the copper film at the ceramic substrate by heating in a sintering furnace under $\leq 1$ atmosphere pressure.
Figure 10:
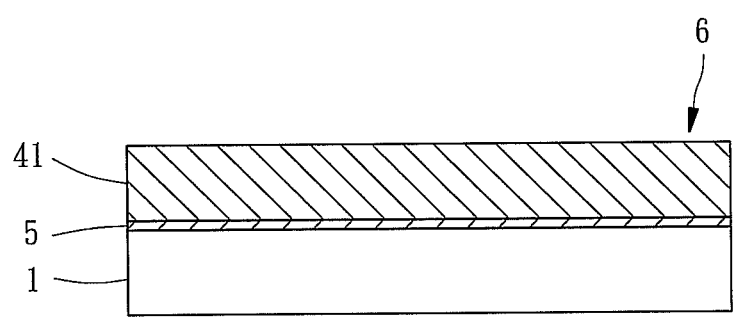
FIG. 10 corresponds to FIG. 9, illustrating a composite plate formed.

FIGS. 6 through 10 illustrate a single-side copper foil bonding process in accordance with the present invention. At first, employ a compression molding technique to sinter a powder material into a ceramic substrate 1 (see FIG. 6) under an atmosphere pressure or non-oxygen high temperature (1900° C.) environment.

PROCESS I: Form a copper film 2 on one surface of the ceramic substrate 1 in a sputtering machine by means of sputtering deposition. The opposite surface of the ceramic substrate 1 must be protected by an insulation layer, avoiding coating of copper on the non-sputtering surface of the ceramic substrate.

PROCESS II: Electroplate a copper layer 3 on the copper film 2 at the substrate 1 at room temperature (see FIG. 8) so that the copper layer 3 and the copper film 2 form a copper dielectric layer having a thickness about 10~50 μm.

PROCESS III: Press a surface-cleaned copper foil 4 on the dielectric layer at the ceramic substrate 1 and then put them in a high-temperature sintering furnace for bonding (see FIG. 9). The sintering furnace can contain therein a vacuum, negative pressure caused by inert gas or $H_2$ partial pressure, keeping its internal pressure $\leqq 1$ atmosphere pressure. By means of diffusion bonding, the copper film 2, the copper layer 3 and the copper foil 4 are bonded into a copper strip 41 where diffusion between the surface of the copper strip 41 and the atoms of the ceramic substrate 1 causes formation of a bonding layer 5. Thus, the copper strip 41 and the ceramic substrate 1 are tightly bonded together, forming a composite plate 6 (see FIG. 10).

In conclusion, the method of using copper foil(s) 4 and a ceramic substrate 1 to make a composite plate 6 in accordance with the present invention employs a diffusion bonding technique to bond copper foil(s) 4 to a ceramic substrate 1 under high temperature, vacuum, and negative pressure caused by inert gas or $H_2$ partial pressure environments. The ceramic substrate can be bonded with a copper foil at one single side or both sides through a single diffusion bonding process, reducing heat-treatment process. When compared to conventional method of directly bonding copper to substrate, the invention simplifies the manufacturing process, saving much time and energy.

The method of employing a diffusion bonding technique to bond a copper foil to one or both sides of a ceramic substrate under high temperature, vacuum, and negative pressure caused by inert gas or $H_2$ partial pressure environments in making a composite plate simply requires one single heat treatment process in a sintering furnace. When compared to the conventional direct bonding technique that requires multiple heat-treatment processes, the invention saves much time and energy. The diffusion bonding technique of the present invention enables the bonding layer to provide a strong adhesive force between the copper foil and the ceramic substrate. By means of pressing the copper foil and the ceramic substrate together and sintering them in a sintering furnace at a high temperature, the ceramic substrate and the copper foil are directly bonded together, avoiding dropping of the copper foil.

In the second embodiment of the present invention, the PROCESS II may be omitted subject to the thickness of the copper foil. By means of diffusion bonding, the copper foil is bonded with the copper dielectric layer and the ceramic substrate, where diffusion between the surface of the copper dielectric and the atoms of the ceramic substrate causes formation of a bonding layer. Thus, the copper foil and the ceramic substrate are tightly bonded together, forming a composite plate. This manufacturing process needs not to electroplate copper on the sputtered ceramic substrate.

In general, the advanced copper bonding (ACB) with ceramic substrate technology of the invention includes the steps of (I) forming a copper film on a ceramic substrate in a sputtering machine; (II) electroplating a copper layer on the copper film at the ceramic substrate at room temperature; (III) pressing a copper foil on the copper layer at the ceramic substrate and employing a diffusing bonding technique to bond the copper layer to the ceramic substrate in a sintering furnace under the environments of high temperature, vacuum, and negative pressure caused by inert gas or $H_2$ partial pressure, wherein step (II) can be omitted subject to the thickness of the copper foil.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An advanced copper bonding (ACB) method for joining copper to a ceramic substrate, the method comprising the steps of:
   i) depositing a copper film on at least one of two opposing surfaces of a ceramic substrate in a sputtering machine to form a copper dielectric layer on at least one of two opposing surfaces of said ceramic substrate; and
   ii) preparing a copper foil (4) and pressing said copper foil (4) on said ceramic substrate (1) and then putting said copper foil (4) with said ceramic substrate (1) in a high-temperature sintering furnace at a pressure $\leqq 1$ atmosphere pressure to let said copper dielectric layer and said copper foil (4) be bonded into a copper strip (41) by a diffusion bonding technique where diffusion between the surface of said copper strip (41) and atoms of said ceramic substrate (1) causes formation of a bonding layer (5) so that said copper strip (41) and said ceramic substrate (1) are tightly bonded together, forming a composite plate,
   wherein said ceramic substrate is prepared by sintering aluminum trioxide or aluminum nitride under an atmosphere pressure or non-oxygen high temperature environment, said non-oxygen high temperature environment being at a temperature of 1900° C.,
   wherein a copper dielectric layer is formed on each of the two opposing surfaces of said ceramic substrate,
   wherein formation of the copper film on at least one of two opposing surfaces of said ceramic substrate (1) in said sputtering machine is done under the conditions of operating temperature about 150° C. and vacuum about $1.33 \times 10^{-3}$ torr and the thickness of said copper film is smaller than 1 μm,
   the method further comprising a sub step of electroplating a copper layer on said copper film prior to putting said copper foil (4) with said ceramic substrate (1) in said high-temperature sintering furnace, enabling said copper layer and said copper film to form a copper dielectric layer having a thickness within 10~50 μm.

2. The advanced copper bonding (ACB) method for joining copper to a ceramic substrate as claimed in claim 1, wherein said ceramic substrate is made by a doctor blade tape casting process or powder compression molding technique and sintered at atmospheric pressure or under a non-oxygen high temperature environment, said non-oxygen high temperature environment being at a temperature of 1900° C.

3. The advanced copper bonding (ACB) method for joining copper to a ceramic substrate as claimed in claim 1, wherein said copper foil (4) is cleaned to remove impurities and grease before bonding, and cleaning of said copper foil (4) is done by: dipping said copper foil (4) in diluted hydrochloric acid solution at temperature below 60° C. for 1 minute, and then picking up said copper foil (4) from diluted hydrochloric acid solution and rinsing said copper foil (4) with de-ionized water.

4. The advanced copper bonding (ACB) method for joining copper to a ceramic substrate as claimed in claim 1, wherein said diffusion bonding technique is applied under an inert gas environment and the conditions of bonding temperature within 900~1200° C. and the vacuum being within 1~760 torr and bonding time within 5~10 minutes.

5. The advanced copper bonding (ACB) method for joining copper to a ceramic substrate as claimed in claim 1, wherein said diffusion bonding technique is applied under a $H_2$ partial pressure environment at 2 psi and the conditions of bonding temperature within 900~1200° C. and bonding time within 5~10 minutes.

\* \* \* \* \*